US012695034B2

(12) United States Patent
Uenaka et al.

(10) Patent No.: US 12,695,034 B2
(45) Date of Patent: Jul. 28, 2026

(54) SOLID ELECTROLYTE CAPACITOR ELEMENT, SOLID ELECTROLYTE CAPACITOR, AND CARBON PASTE FOR SOLID ELECTROLYTE CAPACITOR ELEMENT

(71) Applicant: Panasonic Intellectual Property Management Co., Ltd., Kadoma (JP)

(72) Inventors: Keita Uenaka, Osaka Fu (JP); Kei Hirota, Okayama Ken (JP); Takahiro Yoshii, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 23 days.

(21) Appl. No.: 18/687,013

(22) PCT Filed: Aug. 8, 2022

(86) PCT No.: PCT/JP2022/030227
§ 371 (c)(1),
(2) Date: Feb. 27, 2024

(87) PCT Pub. No.: WO2023/032602
PCT Pub. Date: Mar. 9, 2023

(65) Prior Publication Data
US 2025/0132100 A1 Apr. 24, 2025

(30) Foreign Application Priority Data
Aug. 31, 2021 (JP) ................................. 2021-141579

(51) Int. Cl.
*H01G 9/042* (2006.01)
*H01G 9/15* (2006.01)

(52) U.S. Cl.
CPC ............. *H01G 9/0425* (2013.01); *H01G 9/15* (2013.01)

(58) Field of Classification Search
CPC ................................ H01G 9/15; H01G 9/0425
See application file for complete search history.

(56) References Cited

U.S. PATENT DOCUMENTS

2006/0215352 A1 9/2006 Take et al.
2009/0195966 A1* 8/2009 Ozawa ................... H01G 11/48
361/523

(Continued)

FOREIGN PATENT DOCUMENTS

CN 101479819 A * 7/2009 ............... H01G 9/15
JP H11-297574 A 10/1999

(Continued)

OTHER PUBLICATIONS

International Search Report dated Oct. 25, 2022, issued in counterpart International Application No. PCT/JP2022/030227 (5 pages).
(Continued)

*Primary Examiner* — David M Sinclair
(74) *Attorney, Agent, or Firm* — WHDA, LLP

(57) ABSTRACT

A solid electrolytic capacitor element includes an anode body; a dielectric layer formed on a surface of the anode body; a solid electrolyte layer that covers at least a portion of the dielectric layer; and a carbon layer that covers at least a portion of the solid electrolyte layer and contains carbon particles. The carbon layer shows a D/G ratio of 1.5 or less, the D/G ratio being a ratio of an intensity of a D band relative to an intensity of a G band in a Raman spectrum of the carbon layer.

6 Claims, 1 Drawing Sheet

(56)     References Cited

U.S. PATENT DOCUMENTS

| | | | | |
|---|---|---|---|---|
| 2011/0105685 A1* | 5/2011 | Kambara | ............. | B82Y 30/00 |
| | | | | 423/447.3 |
| 2016/0009561 A1 | 1/2016 | Coleman et al. | | |
| 2018/0248194 A1* | 8/2018 | Cheng | ................... | C01B 32/192 |
| 2021/0125787 A1* | 4/2021 | Iwaoka | .................. | H01G 9/012 |
| 2022/0277901 A1 | 9/2022 | Hirota et al. | | |
| 2023/0017930 A1* | 1/2023 | Koseki | .................. | H01G 9/028 |
| 2023/0070969 A1* | 3/2023 | Yamasaki | ............. | H01G 9/048 |

FOREIGN PATENT DOCUMENTS

| | | | | | |
|---|---|---|---|---|---|
| JP | 2006-140142 | A | 6/2006 | | |
| JP | 2006-269570 | A | 10/2006 | | |
| JP | 2007-305686 | A | 11/2007 | | |
| JP | 2011-210917 | A | 10/2011 | | |
| JP | 2014-231444 | A | 12/2014 | | |
| JP | 2016-515090 | A | 5/2016 | | |
| JP | 2018-159059 | A | 10/2018 | | |
| JP | 2020-138879 | A | 9/2020 | | |
| WO | WO-2019167774 | A1 * | 9/2019 | .......... | H01G 9/0425 |
| WO | 2021/024926 | A1 | 2/2021 | | |

OTHER PUBLICATIONS

Office Action dated Jun. 9, 2026, issued in counterpart JP Application No. 2023-545392 (4 pages).

* cited by examiner

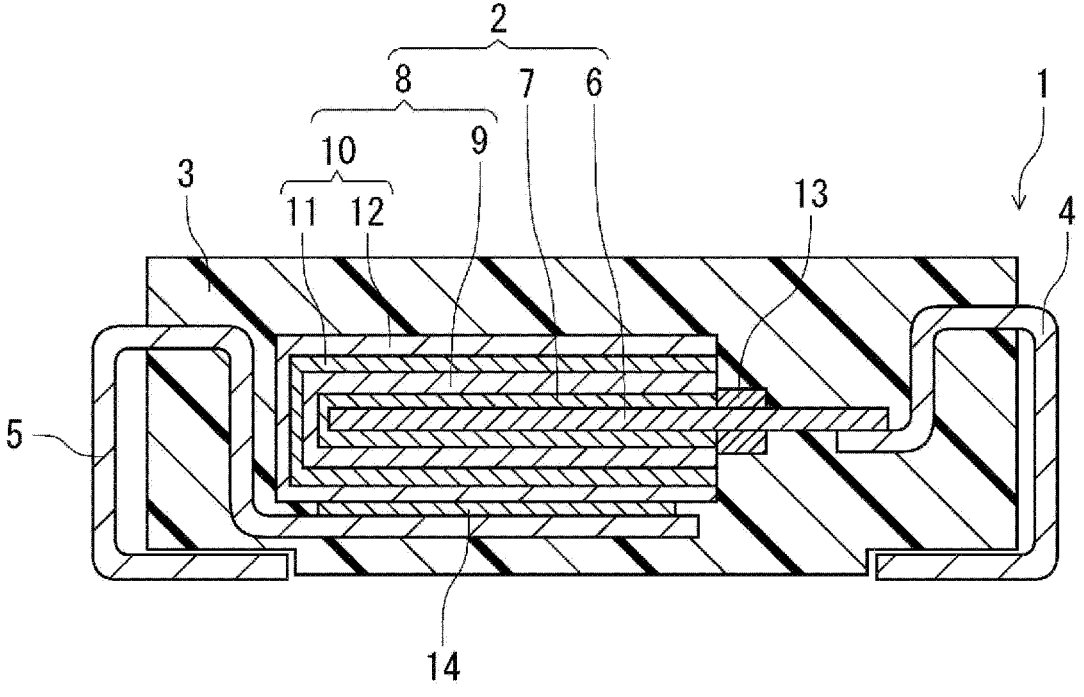

SOLID ELECTROLYTE CAPACITOR ELEMENT, SOLID ELECTROLYTE CAPACITOR, AND CARBON PASTE FOR SOLID ELECTROLYTE CAPACITOR ELEMENT

CROSS REFERENCE TO RELATED APPLICATIONS

This Application is the National Stage of International Application No. PCT/JP2022/030227, filed on Aug. 8, 2022, which claims priority from Application No. 2021-141579 filed on Aug. 31, 2021 in Japan. The entire contents of these applications are incorporated herein by reference in their entirety.

TECHNICAL FIELD

The present disclosure relates to a solid electrolytic capacitor element, a solid electrolytic capacitor that includes the solid electrolytic capacitor element, and a carbon paste that is used to form a carbon layer included in the solid electrolytic capacitor element.

BACKGROUND ART

A solid electrolytic capacitor includes a solid electrolytic capacitor element and a resin outer housing or a case that seals the solid electrolytic capacitor element. The solid electrolytic capacitor element includes: for example, an anode body; a dielectric layer formed on a surface of the anode body; a solid electrolyte layer that covers at least a portion of the dielectric layer and contains a conductive polymer component; and a cathode extraction layer that covers at least a portion of the solid electrolyte layer. The cathode extraction layer includes: for example, a carbon layer that covers at least a portion of the solid electrolyte layer; and a metal-containing layer that covers at least a portion of the carbon layer. The performance of the solid electrolytic capacitor is greatly affected by the state of the solid electrolyte layer. Due to the influence of the carbon layer, the solid electrolyte layer may deteriorate to reduce the capacitor performance.

Patent Literature 1 proposes a solid electrolytic capacitor including an anode body, a dielectric film, a solid electrolyte layer, and a conductive paste layer that are formed sequentially, wherein the solid electrolyte layer is formed using a conductive polymer compound, the conductive paste layer contains an acrylic resin and a cellulose resin as binders, and the conductive paste layer has a thickness of 20 to 40 μm.

CITATION LIST

Patent Literature

[PTL 1] Japanese Laid-Open Patent Publication No. H11-297574

SUMMARY OF INVENTION

Technical Problem

In the solid electrolytic capacitor disclosed in Patent Literature 1, the resistance of the conductive paste layer increases greatly after the solid electrolytic capacitor is exposed to a high temperature environment, and the equivalent series resistance (ESR) of the solid electrolytic capacitor increases greatly. Depending on the application, solid electrolytic capacitors may be used in high temperature environments. For this reason, there is a demand for reducing the increase of ESR even when they are exposed to high temperature environments.

Solution to Problem

A first aspect of the present disclosure relates to a solid electrolytic capacitor element including: an anode body; a dielectric layer formed on a surface of the anode body; a solid electrolyte layer that covers at least a portion of the dielectric layer; and a carbon layer that covers at least a portion of the solid electrolyte layer and contains carbon particles, wherein the carbon layer shows a D/G ratio of 1.5 or less, the D/G ratio being a ratio of an intensity of a D band relative to an intensity of a G band in a Raman spectrum of the carbon layer.

A second aspect of the present disclosure relates to a solid electrolytic capacitor including at least one of the solid electrolytic capacitor element described above.

A third aspect of the present disclosure relates to a carbon paste for a solid electrolytic capacitor element that is used to form a carbon layer included in the solid electrolytic capacitor element, the carbon paste containing: carbon particles; and a dispersion medium, wherein a dried coating film formed using the carbon paste shows a D/G ratio of 1.5 or less, the D/G ratio being a ratio of an intensity of a D band relative to an intensity of a G band in a Raman spectrum of the dried coating film.

Advantageous Effects of Invention

With the solid electrolytic capacitor, ESR after the solid electrolytic capacitor is exposed to a high temperature environment can be suppressed to a low level.

BRIEF DESCRIPTION OF DRAWINGS

FIG. 1 is a schematic cross-sectional view of a solid electrolytic capacitor according to an embodiment of the present disclosure.

DESCRIPTION OF EMBODIMENTS

Novel features of the present invention are set forth in the appended claims. However, the present invention will be well understood from the following detailed description of the present invention with reference to the drawings, in terms of both the configuration and the content together with other objects and features of the present invention.

It is considered that, when a solid electrolytic capacitor is exposed to a high temperature environment, due to the influence of oxygen contained in the air intruding into the solid electrolytic capacitor, oxidative deterioration of the solid electrolyte layer proceeds remarkably, which reduces conductivity to decrease the ESR of the solid electrolytic capacitor. In a high temperature and humidity environment, the influence of action of moisture also increases in addition to the influence of action of oxygen. In this case, by the action of moisture, a dedoped state in which a dopant desorbs from the solid electrolyte layer is likely to proceed in addition to the oxidative deterioration of the solid electrolyte layer. Accordingly, the reduction in ESR is likely to occur remarkably.

If the solid electrolytic capacitor is configured such that air easily flows into the carbon layer or adhesion between the solid electrolyte layer and the carbon layer is low, air is likely to intrude into the solid electrolyte layer, which leads to the reduction in ESR described above.

In view of the above, a solid electrolytic capacitor element according to the present disclosure is configured such that a carbon layer included in the solid electrolytic capacitor element shows a D/G ratio of 1.5 or less in a Raman spectrum of the carbon layer. It is considered that, when the carbon layer shows a D/G ratio within the above-described range, the surface state of carbon particles is improved, and a π conjugated system extends in the surface layer of the carbon particles. The carbon particles approach other carbon particles contained in the carbon layer that have graphite structure and molecules of components that have a π con- jugated system (for example, molecules of an acid group- containing compound, which will be described later, binder molecules, or additive molecules) by a π-π interaction. Because the distance between the carbon particles is short- ened, a conductive path is likely to extend within the carbon layer. Accordingly, the carbon layer provides high conduc- tivity, and thus the initial ESR can be suppressed to a low level. The high conductivity of the carbon layer is consid- ered to be also affected by the carbon particles having a low bulk resistance. (1) A solid electrolytic capacitor element according to a first aspect of the present disclosure includes: an anode body; a dielectric layer formed on a surface of the anode body; a solid electrolyte layer that covers at least a portion of the dielectric layer; and a carbon layer that covers at least a portion of the solid electrolyte layer and contains carbon particles, wherein the carbon layer shows a D/G ratio of 1.5 or less, the D/G ratio being a ratio of an intensity of a D band relative to an intensity of a G band in a Raman spectrum of the carbon layer.

Also, in the solid electrolytic capacitor element according to the present disclosure, as described above, the distance between the carbon particles and the distance between the carbon particles and the molecules of an acid group-con- taining compound, a binder, an additive, or the like are shortened. For this reason, it is considered that the air permeability of the carbon layer decreases. Accordingly, even when the solid electrolytic capacitor is exposed to a high temperature environment or a high temperature and humidity environment, air intruding into the solid electrolyte layer is suppressed, and the occurrence of the oxidative deterioration of the solid electrolyte layer and the dedope of the dopant is suppressed. As a result, it is considered that the reduction in ESR when the solid electrolytic capacitor is exposed to a high temperature environment is reduced. Also, it is also considered that, even when the solid electrolytic capacitor is exposed to a high temperature and humidity environment, the reduction in ESR is reduced. As described above, with the solid electrolytic capacitor element accord- ing to the present disclosure, in addition to the initial ESR being low, the ESR can also be suppressed to a low level even after the solid electrolytic capacitor element is exposed to a high temperature environment or a high temperature and humidity environment. Accordingly, high reliability can be obtained.

(2) The present disclosure also encompasses a solid electrolytic capacitor that includes at least one solid elec- trolytic capacitor element configured as described in (1) given above.

Also, the present disclosure also encompasses a carbon paste for a solid electrolytic capacitor element that is useful to form the carbon layer described above. In the carbon paste according to the present disclosure, a dried coating film formed using the carbon paste shows a D/G ratio of 1.5 or less in a Raman spectrum of the dried coating film. It can also be said that, in Raman spectrum measurement, the dried coating film is equivalent to a sample of the carbon layer included in the solid electrolytic capacitor element. More specifically, (3) a carbon paste for a solid electrolytic capaci- tor element according to the present disclosure is a carbon paste for a solid electrolytic capacitor element that is used to form a carbon layer included in the solid electrolytic capaci- tor element, the carbon paste containing: carbon particles; and a dispersion medium. Here, a dried coating film formed using the carbon paste shows a D/G ratio of 1.5 or less, the D/G ratio being a ratio of an intensity of a D band relative to an intensity of a G band in a Raman spectrum of the dried coating film.

A Raman spectrum of the carbon layer or the dried coating film formed using the carbon paste shows a D band at a frequency around 1300 $cm^{-1}$ to 1400 $cm^{-1}$ (more specifi- cally, around 1350 $cm^{-1}$), and a G band at a frequency around 1550 $cm^{-1}$ to 1650 $cm^{-1}$ (more specifically, around 1590 $cm^{-1}$). The G band refers to a peak derived from the graphite structure of the carbon particles, and the D band refers to a peak derived from structural defects of the carbon particles. It can be said that the smaller the value of the ratio (=the D/G ratio) of the intensity of the D band relative to the intensity of the G band in a Raman spectrum, the better the surface state of the carbon particles contained in the carbon layer or the dried coating film formed using the carbon paste.

(4) In any one of (1) to (3) given above, the D/G ratio may be 1 or less.

(5) In any one of (1) to (4) given above, the carbon particles may have an average particle size D50 of 0.1 μm or more and 10 μm or less.

(6) In any one of (1) to (5) given above, the carbon particles may include flake-shaped particles.

(7) In any one of (1) to (6) given above, the carbon layer may contain one or two or more acid group-containing compounds.

Hereinafter, a solid electrolytic capacitor, a solid electro- lytic capacitor element, and a carbon paste according to the present disclosure including the solid electrolytic capacitor, the solid electrolytic capacitor element, and the carbon paste described in (1) to (7) given above will be described more specifically with reference to the drawings as appropriate. At least one of the solid electrolytic capacitor, the solid elec- trolytic capacitor element, and the carbon paste described in (1) to (7) given above may be combined with at least one of elements described below as long as they do not technically contradict to each other.

[Solid Electrolytic Capacitor]

The solid electrolytic capacitor includes one or two or more solid electrolytic capacitor elements. Hereinafter, the term "solid electrolytic capacitor element" may also be referred to simply as "capacitor element".

(Capacitor Element)

(Anode Body)

An anode body included in the capacitor element can contain a valve metal, a valve metal-containing alloy, a valve metal-containing compound, or the like. The anode body may contain these materials alone or a combination of two more. As the valve metal, for example, aluminum, tantalum, niobium, or titanium is preferably used. An anode body with a porous surface can be obtained by roughening a surface of a valve metal-containing substrate (a substrate in the form of a sheet (for example, in the form of a foil or a plate), or the like) through, for example, etching. The roughening can be performed by, for example, etching processing. Also, the anode body may be a molded body obtained using valve metal-containing particles, or a sintered body thereof. The molded body and the sintered body each have a porous structure. The molded body and the sintered body each may be in the shape of a sheet, a rectangular parallelepiped, a cube, or a shape similar thereto.

The anode body usually includes an anode extraction portion and a cathode forming portion. A cathode portion is usually formed on the cathode forming portion of the anode body via a dielectric layer. An anode lead is connected to the anode extraction portion.

(Dielectric Layer)

The dielectric layer is an insulating layer that is formed to cover at least a portion of the anode body and functions as a dielectric. The dielectric layer is formed by anodically oxidizing the valve metal on the anode body surface through chemical treatment or the like. It is sufficient that the dielectric layer is formed to cover at least a portion of the anode body. The dielectric layer is usually formed on the anode body surface. The dielectric layer is formed on the porous surface of the anode body, and thus the surface of the dielectric layer has very fine irregularities as described above.

The dielectric layer contains an oxide of a valve metal. For example, in the case where tantalum is used as the valve metal, the dielectric layer contains $Ta_2O_5$. In the case where aluminum is used as the valve metal, the dielectric layer contains $Al_2O_3$. The configuration of the dielectric layer is not limited thereto as long as it is possible to function as a dielectric.

(Solid Electrolyte Layer)

A solid electrolyte layer included in the capacitor element is formed on the anode body surface via the dielectric layer so as to cover the dielectric layer. The solid electrolyte layer does not necessarily need to be formed to cover the entire dielectric layer (for example, the entire surface of the dielectric layer), and it is sufficient that the solid electrolyte layer is formed to cover at least a portion of the dielectric layer. The solid electrolyte layer constitutes at least a portion of the cathode portion of the solid electrolytic capacitor.

The solid electrolyte layer contains a conductive polymer. The solid electrolyte layer may further contain at least one of a dopant and an additive as needed.

As the conductive polymer, any known conductive polymer used in solid electrolytic capacitors can be used. For example, a π conjugated conductive polymer or the like can be used. As the conductive polymer, for example, a polymer whose basic skeleton is a polypyrrole, a polythiophene, a polyaniline, a polyfuran, a polyacetylene, a polyphenylene, a polyphenylene vinylene, a polyacene, or a polythiophene vinylene can be used. Out of these, it is preferable to use a polymer whose basic skeleton is a polypyrrole, a polythiophene, or a polyaniline. The polymers listed above also include a homopolymer, a copolymer composed of two or more monomers, and derivatives thereof (a substituted body that has a substituent, or the like). For example, the polythiophene include poly(3,4-ethylenedioxythiophene) and the like.

These conductive polymers may be used alone or in a combination of two or more.

The solid electrolyte layer may further contain a dopant. As the dopant, for example, at least one selected from the group consisting of an anion and a polyanion can be used.

Examples of the anion include a sulfuric acid ion, a nitric acid ion, a phosphoric acid ion, a boric acid ion, an organic sulfonic acid ion, and a carboxylic acid ion. However, the anion is not specifically limited thereto. As a dopant that generates a sulfonic acid ion, for example, benzene sulfonic acid, p-toluene sulfonic acid, or naphthalene sulfonic acid can be used.

Examples of the polyanion include a polymer-type polysulfonic acid and a polymer-type polycarboxylic acid. Examples of the polymer-type polysulfonic acid include polyvinyl sulfonic acid, polystyrene sulfonic acid, polyallyl sulfonic acid, polyacryl sulfonic acid, polymethacryl sulfonic acid, and the like. Examples of the polymer-type polycarboxylic acid include polyacrylic acid, polymethacrylic acid, and the like. Examples of the polyanion also include a polyester sulfonic acid, a phenol sulfonic acid novolak resin, and the like. However, the polyanion is not limited thereto.

The dopant may be contained in the solid electrolyte layer in a free form, in an anion form, or a salt form. Alternatively, the dopant may be contained in the solid electrolyte layer in a form that is bonded to or interacted with the conductive polymer.

The amount of the dopant contained in the solid electrolyte layer is, for example, 10 parts by mass or more and 1000 parts by mass or less, and may be 20 parts by mass or more and 500 parts by mass or less, or 50 parts by mass or more and 200 parts by mass or less relative to 100 parts by mass of the conductive polymer.

The solid electrolyte layer may be composed of a single layer or a plurality of layers. In the case where the solid electrolyte layer is composed of a plurality of layers, the layers may contain the same conductive polymer or different conductive polymers. Also, the layers may contain the same dopant or different dopants.

The solid electrolyte layer may further optionally contain a known additive and a known conductive material other than the conductive polymer component. As the known conductive material, for example, at least one selected from the group consisting of a conductive inorganic material such as manganese dioxide and a TCNQ complex salt may be used.

A layer for enhancing adhesion between the dielectric layer and the solid electrolyte layer or the like may be interposed between the dielectric layer and the solid electrolyte layer.

The solid electrolyte layer is formed using, for example, a treatment liquid that contains a precursor for the conductive polymer by polymerizing the precursor on the dielectric layer. The polymerization can be performed by at least one of chemical polymerization and electrolytic polymerization. The precursor for the conductive polymer may be a monomer, an oligomer, a prepolymer, or the like. The solid electrolyte layer may be formed by applying a treatment liquid (for example, a dispersion liquid or a solution) that contains the conductive polymer to the dielectric layer, and then drying the applied treatment liquid. As a dispersion medium (or a solvent), for example, water, an organic solvent, or a mixture thereof may be used. The treatment liquid may further contain another component (at least one selected from the group consisting of a dopant, an additive, and the like).

In the case where the treatment liquid contains the precursor for the conductive polymer, an oxidant is used to polymerize the precursor. The oxidant may be contained in the treatment liquid as an additive. Also, the oxidant may be applied to the anode body before or after the treatment liquid is brought into contact with the anode body in which the dielectric layer has been formed. Examples of the oxidant include a compound capable of forming $Fe^{3+}$ (ferric sulfate or the like), a persulfate (sodium persulfate, ammonium persulfate, or the like), and hydrogen peroxide. These oxidants may be used alone or in a combination of two or more.

The step of forming the solid electrolyte layer through immersion in the treatment liquid and polymerization (or drying) may be performed only once, or may be repeated a plurality of times. In each time, conditions such as the composition of the treatment liquid and the viscosity of the treatment liquid may be the same, or at least one of the conditions may be changed.

(Cathode Extraction Layer)

The capacitor element usually includes a cathode extraction layer that covers at least a portion of the solid electrolyte layer. The solid electrolyte layer and the cathode extraction layer together may constitute the cathode portion of the capacitor element. In the capacitor element according to the present disclosure, the cathode extraction layer includes a carbon layer that covers at least a portion of the solid electrolyte layer. The cathode extraction layer may include a carbon layer and a metal-containing layer that covers a portion of the carbon layer.

(Carbon Layer)

The carbon layer contains carbon particles (more specifically, conductive carbon particles). The carbon layer may further contain an acid group-containing compound. The carbon layer may further contain a binder. Also, the carbon layer may further contain an additive.

(D/G Ratio)

In the present disclosure, the carbon layer shows a D/G ratio of 1.5 or less in a Raman spectrum of the carbon layer. As a result of the D/G ratio taking a small value as described above, the initial ESR can be reduced, and the ESR of the solid electrolytic capacitor can be suppressed to a low level even when the solid electrolytic capacitor is exposed to a high temperature environment or a high temperature and humidity environment as described above. In the case where the D/G ratio is 1 or less (preferably 0.8 or less), the increase in ESR when the solid electrolytic capacitor is exposed to a high temperature environment or a high temperature and humidity environment can be particularly remarkably suppressed.

The D/G ratio of the carbon layer and the D/G ratio of a dried coating film formed using a carbon paste for forming the carbon layer are affected by the D/G ratio of carbon particles (raw material particles) used to prepare the carbon paste for forming the carbon layer, but are different from the D/G ratio of the raw material particles. More specifically, the D/G ratio of the carbon layer and the D/G ratio of the dried coating film formed using the carbon paste tend to be smaller than the D/G ratio measured on the surface of the raw material particles. It can be seen from this fact that in the carbon layer or the dried coating film, the surface state of the carbon particles is improved as compared with the surface state of the carbon particles used as a raw material. The D/G ratio of the carbon layer and the D/G ratio of the dried coating film can be adjusted by, for example, using carbon particles (raw material particles) that have a relatively small D/G ratio, using carbon particles that have a relatively small average particle size D50, selecting the shape of carbon particles, selecting the type of acid group-containing compound, the type of binder, or the type of additive, or adjusting the amount of acid group-containing compound, the amount of binder, or the amount of additive.

(Carbon Particles)

The carbon particles have an average particle size D50 of, for example, 0.1 μm or more and 15 μm or less. In the case where the D/G ratio is within the above-described range, when the average particle size D50 of the carbon particles is small, the initial ESR and variation in ESR after the solid electrolytic capacitor is exposed to a high temperature environment tend to be small. When the average particle size D50 of the carbon particles is small, the number of contact points between the solid electrolyte layer and the carbon particles increases. For this reason, it is effective to reduce the initial ESR. From the viewpoint of further reducing the initial ESR and variation in ESR after the solid electrolytic capacitor is exposed to a high temperature environment, the average particle size D50 of the carbon particles is preferably 0.1 μm or more and 10 μm or less, and more preferably 0.1 μm or more and 5 μm or less, and may be 0.1 μm or more and 2 μm or less (or 1 μm or less).

In the specification of the present application, the term "average particle size D50" refers to a particle size (median size) at 50% cumulative volume in a volume-based particle size distribution obtained using a particle size distribution measurement apparatus based on a dynamic light scattering (DLS) method.

There is no particular limitation on the shape of the carbon particles. From the viewpoint of easily obtaining the π-π interaction between the carbon particles and easily increasing the filling rate of carbon particles in the carbon layer, the carbon layer preferably contains at least flake-shaped carbon particles. Examples of the flake-shaped carbon particles include flake-shaped graphite particles, flake-shaped graphene particles, and the like.

The flake-shaped carbon particles may have an average aspect ratio of, for example, 1 or more and 20000 or less, or 1 or more and 7000 or less. When the average aspect ratio is within the above-described range, the conductive path in the carbon layer is more likely to extend, and it is therefore advantageous to increase conductivity.

From the viewpoint of easily adjusting the D/G ratio of the carbon layer or the D/G ratio of the dried coating film formed using the carbon paste within the above-described range, it is preferable to use graphite particles as the carbon particles. As used herein, the term "graphite" means a material that has a graphite crystal structure. Examples of graphite materials include natural graphite, artificial graphite, and graphitized mesophase carbon particles. The carbon particles may contain the above-listed graphite materials alone or in a combination of two or more.

The carbon layer may contain a carbonaceous material (a second carbonaceous material) other than the graphite (a first carbonaceous material). As the second carbonaceous material, carbon black, carbon nanotubes, graphene, or the like can be used. However, it is preferable to set the ratio of the first carbonaceous material relative to all of the carbonaceous materials contained in the carbon layer to be larger than the ratio of the second carbonaceous material such that the D/G ratio in a Raman spectrum of the carbon layer or the dried coating film formed using the carbon paste is within the above-described range. The ratio of the first carbonaceous material (graphite particles) relative to all of the carbonaceous materials contained in the carbon layer is, for example, 90 mass % or more, and may be 95 mass % or more. The ratio of the first carbonaceous material (graphite particles) relative to all of the carbonaceous materials contained in the carbon layer is 100 mass % or less. The carbonaceous material contained in the carbon layer may be composed only of graphite particles.

The content of the carbon particles (first carbonaceous material) in the carbon layer is, for example, 50 mass % or more and 95 mass % or less, and may be 50 mass % or more and 75 mass % or less. When the content of the carbon particles is within the above-described range, the high conductivity of the carbon layer and the high adhesion between the carbon layer and the solid electrolyte layer can be easily balanced.

(Acid Group-Containing Compound)

The carbon layer may contain an acid group-containing compound. In the carbon layer, the acid group may be contained in a free form, in an anion form, or a salt form, or may be contained in a form that is bonded to or interacted with another component contained in the carbon layer or the solid electrolyte layer. The conductive polymer contained in the solid electrolyte layer has a functional group that is likely to be positively charged. For this reason, in the case where the carbon layer contains an acid group-containing compound, the acid group of the acid group-containing compound and the functional group of the conductive polymer contained in the solid electrolyte layer are bonded, as a result of which, the adhesion between the solid electrolyte layer and the carbon layer can be increased. The acid group-containing compound may have an aromatic ring, or may be a polymer. In the case where the acid group-containing compound has an aromatic ring, due to the π-π interaction between the carbon particles, the adhesion between the acid group-containing compound and the carbon particles can be increased. Also, in the case where the acid group-containing compound is a polymer, the polymer chain is entangled with the carbon particles, and thus the adhesion between the acid group-containing compound and the carbon particles can be further increased. Due to these factors, the air permeability of the carbon layer is further reduced, and the adhesion between the carbon layer and the solid electrolyte layer is also increased, and thus the air flowing into solid electrolyte layer can also be further reduced.

Examples of the acid group-containing compound include an acid group-containing aromatic compound, an acid group-containing resin, and the like. Examples of acid groups include a sulfonic acid group, a carboxy group, a phenolic hydroxy group, and the like. The acid group-containing compound may have one or two or more acid groups. A sulfonic acid group is preferably contained in the aromatic compound as an acid group of the aromatic compound. The carbon layer may contain one or two or more acid group-containing compounds. The carbon layer may contain at least one or both of an acid group-containing aromatic compound and an acid group-containing resin.

The sulfonic acid group-containing aromatic compound may be, for example, an aromatic compound that has a sulfonic acid group and 6 or more and 14 or less carbon atoms. Specific examples of the aromatic compound include benzene sulfonic acid, toluene sulfonic acid, and naphthalene sulfonic acid. However, the aromatic compound is not limited thereto. The aromatic compound has, for example, 1 or more and 3 or less sulfonic acid groups, and preferably 1 or 2 sulfonic acid groups.

The sulfonic acid group-containing aromatic compound also encompasses an oligomer that contains, as a monomer unit, a polymerizable monomer that has an aromatic ring that has a sulfonic acid group. The oligomer may contain only the above-described monomer unit, or may contain another monomer unit in addition to the above-described monomer unit. The degree of polymerization of the monomer unit in the oligomer may be, for example, 2 or more and 100 or less, and may be 2 or more and 50 or less.

The sulfonic acid group-containing aromatic compound may have a weight average molecular weight (Mw) of, for example, 20,000 or less, 10,000 or less, 5,000 or less, or 1,000 or less.

The carbon layer may contain one sulfonic acid group-containing aromatic compound or a combination of two or more sulfonic acid group-containing aromatic compounds.

In the specification of the present application, the term "weight average molecular weight (Mw)" refers to a value determined based on gel permeation chromatography (GPC) in terms of a polystyrene. GPC is usually performed using a polystyrene gel column and water/methanol (at a volume ratio of 8/2) as a mobile phase.

The acid group-containing resin may contain one or two or more acid groups.

Out of the acid group-containing resin, as a sulfonic acid group-containing resin, for example, a polymer (more specifically, a homopolymer or a copolymer) that contains, as a monomer unit, a polymerizable monomer that has a sulfonic acid group may be used. Examples of the polymer include a polystyrene sulfonic acid, a polyvinyl sulfonic acid, a polyallyl sulfonic acid, a phenol sulfonic acid novolak resin, a poly-2-acrylamide-2-methylpropane sulfonic acid.

Out of the acid group-containing resin, as a carboxy group-containing resin, for example, a polymer (more specifically, a homopolymer or a copolymer) that contains, as a monomer unit, a polymerizable monomer that has a carboxy group may be used. Examples of the polymer include a polyacrylic acid, a polymethacrylic acid, an acrylic acid-methacrylic acid copolymer, an ethylene-acrylic acid copolymer, a (meth)acrylic acid-(meth)acrylic acid ester copolymer (acrylic acid-methyl methacrylate, and the like). Here, the acrylic acid and the methacrylic acid may be collectively referred to as "(meth)acrylic acid". The acrylic acid ester and the methacrylic acid ester may be collectively referred to as "(meth)acrylic acid ester".

As the carboxy group-containing resin, it is also preferable to use a cellulose resin (a cellulose ether or the like) that has a carboxy group, or the like. Examples of the cellulose resin include carboxymethyl cellulose (CMC), salts thereof (an ammonium salt, a sodium salt, a potassium salt, and the like), and the like. The CMC and salts thereof also function as binders.

As the phenolic hydroxy group-containing resin, for example, a phenol resin (a phenolic hydroxy group-containing phenol resin or the like) may be used. The phenol resin also functions as a binder.

From the viewpoint of further increasing the adhesion between the carbon layer and the solid electrolyte layer, in addition to easily obtaining a high adhesion between carbon particles, it is advantageous to use a resin that functions as a binder such as CMC, a salt thereof, or a phenol resin. When the resin that functions as a binder is used, it is unnecessary to use a binder, which will be described later. Also, the resin that functions as a binder may be combined with one or more binders selected from binders which will be listed below as needed. Also, from the viewpoint of easily obtaining an even higher adhesion between the acid group-containing resin and the carbon particles due to the π-π interaction between the carbon particles and the aromatic ring, and entanglement of the polymer chain with the carbon particles, it is also preferable to use, as the acid group-containing resin, a phenol resin, a phenol sulfonic acid novolak resin, or the like. In particular, when at least a resin that contains a sulfonic acid group and an aromatic ring (a phenol sulfonic acid novolak resin, or the like) is used, the adhesion to the carbon particles can be further increased. For this reason, it is more preferable to use the resin that contains a sulfonic acid group and an aromatic ring.

The carbon layer may contain one acid group-containing resin or a combination of two or more acid group-containing resins. For example, the sulfonic acid group-containing resin (a phenol sulfonic acid novolak resin or the like) may be combined with at least one selected from the group consisting of carboxy group-containing resins (CMC, salts thereof, and the like) and phenolic hydroxy group-containing resins (a phenol resin and the like). The carbon layer may contain, in addition to these resins, a sulfonic acid group-containing aromatic compound or the like.

Although it depends on the type of resin, the weight average molecular weight (Mw) of the acid group-containing resin is larger than that of the acid group-containing aromatic compound (an oligomer or the like). The weight average molecular weight (Mw) of the acid group-containing resin may be, for example, greater than 1,000, greater than 10,000, greater than 50,000, or greater than 100,000. The weight average molecular weight (Mw) of the acid group-containing resin is, for example, 3,000,000 or less.

The total amount of the acid group-containing compounds contained in the carbon layer is, for example, 10 parts by mass or more and 100 parts by mass or less, and may be 10 parts by mass or more and 80 parts by mass or less, 10 parts by mass or more and 50 parts by mass or less, or 20 parts by mass or more and 40 parts by mass or less relative to 100 parts by mass of the carbon particles.

(Binder)

As the binder, for example, an organic polymer may be used. The organic polymer may be either one of a curable resin and a thermoplastic resin. The curable resin may be either one of a thermosetting resin and a photocurable resin. As the binder, a curable resin composition that contains a curable resin and at least one selected from the group consisting of a polymerization initiator, a curing agent, a curing accelerator, and a curing catalyst may be used. As the binder, a component different from the acid group-containing resin is usually used. As the binder, a resin that does not contain an acid group is usually used.

Examples of the organic polymer include: a cellulose resin (a cellulose ether, a cellulose ester, and the like), an epoxy resin, an acrylic resin (polymethyl acrylate, polymethyl methacrylate, and the like), a polyimide resin, a polyamide resin, a polyamide imide resin, a polyester resin (aromatic polyesters such as polyethylene terephthalate, aliphatic polyesters, and the like), a fluorine resin, a polyurethane resin, a vinyl resin, a polyolefin resin, and a rubbery material. The vinyl resin also includes polyvinyl acetate and saponified products thereof (a partially saponified product of polyvinyl acetate, a polyvinyl alcohol, and the like). These organic polymers may be either curable (thermosetting, photocurable, or the like) or thermoplastic. These organic polymers may be used alone or in a combination of two or more. As the organic polymer, either one of a hydrophilic organic polymer and a hydrophobic organic polymer may be used, or these organic polymers may be used in combination. Out of these, it is preferable to use an epoxy resin, a polyvinyl alcohol, or the like.

The amount of the binder contained in the layer is, for example, 10 parts by mass or more and 50 parts by mass or less, and may be 15 parts by mass or more and 40 parts by mass or less, or 20 parts by mass or more and 40 parts by mass or less relative to 100 parts by mass of the carbon particles.

(Additive)

Examples of the additive include a dispersion agent, a surfactant, an antioxidant, an antiseptic agent, a base, and an acid. However, the additive is not specifically limited thereto. The carbon layer may contain the additives alone or in combination of two or more.

(Others)

The carbon layer may have a thickness of, for example, 0.1 µm or more and 100 µm or less, or 0.5 µm or more and 50 µm or less.

The carbon layer is formed using, for example, a carbon paste that contains constituent components for constituting the carbon layer and a dispersion medium. More specifically, the carbon layer can be formed by immersing, in the carbon paste, the anode body in which the solid electrolyte layer has been formed, or applying the carbon paste to the surface of the solid electrolyte layer. For example, the carbon layer is formed by drying a coating film of the carbon paste formed to cover the solid electrolyte layer. The drying may be performed under heat as needed.

(Carbon Paste)

The present disclosure also encompasses a carbon paste for forming the carbon layer. As described above, the carbon paste is configured such that a dried coating film formed using the carbon paste shows a D/G ratio of 1.5 or less, and preferably 1 or less (or 0.8 or less) in a Raman spectrum of the dried coating film.

The carbon paste is prepared by mixing, for example, constituent components for constituting the carbon layer and a dispersion medium. As the dispersion medium, for example, a medium that is liquid at room temperature (a temperature of 20° C. or more and 35° C. or less) is used.

The dispersion medium is selected according to the type of acid group-containing compound, the type of binder, or the like. The dispersion medium may be either water or an organic liquid medium. Examples of the organic liquid medium include an alcohol (including a terpene alcohol), a ketone, an ester, an ether, an amide, a nitrile, a sulfoxide, and a hydrocarbon (including a terpene). However, the organic liquid medium is not specifically limited thereto. The carbon paste may contain one dispersion medium or a combination of two or more dispersion media. The carbon paste may contain one organic liquid medium or two or more organic liquid media.

The carbon paste can be obtained by mixing the constituent components. Mixing can be performed using a known method such as, for example, a method using a mixer, a kneader, a homogenizer. In the preparation of the carbon paste, a defoaming treatment may be performed as needed.

Each of the content of the carbon particles relative to dry solids contained in the carbon paste, the amount of the acid group-containing compound (the amount of the sulfonic acid group-containing aromatic compound, the amount of the acid group-containing resin, and the like) relative to 100 parts by mass of the carbon particles, and the amount of the binder can be selected from the content or amount range in the carbon layer.

The carbon paste has a viscosity at 25° C. of, for example, 3,000 mPa·s or less or 1,000 mPa·s or less. It is also possible to prepare a carbon paste that has a viscosity at 25° C. as low as 300 mPa·s or less or 100 mPa·s or less. The viscosity of the carbon paste can be measured using a B-type viscometer at a rotation speed of 10 rpm.

<<Analysis of Carbon Layer, Carbon Paste, or Constituent Components (1) Raman Spectrum In the specification of the present application, the term "a Raman spectrum of a carbon layer or a dried coating film formed using a carbon paste" refers to a Raman spectrum obtained through measurement performed on a cross section of the carbon layer or the dried coating film formed using the carbon paste under the following conditions.

Raman spectrometer: Raman FORCE PAV available from Nanophoton Corporation

Irradiation laser light wavelength: 532 nm

Laser output density: 870 W/cm$^2$

Diffraction grating: 300/cm

Exposure time: 10 s

Measurement wavenumber range: 0 cm$^{-1}$ or more and 4700 cm$^{-1}$ or less

Temperature: 25° C.

In the Raman spectrum measurement, samples obtained through the following procedure can be used. First, a solid electrolytic capacitor is embedded in a curable resin, and the curable resin is cured. The cured product is subjected to grinding processing or cross section polisher processing to shave the carbon layer from its surface side to expose a cross section that is parallel to the plane direction of the carbon layer. In this way, a measurement sample (sample A) is obtained. A dried coating film formed using a carbon paste is formed by applying the carbon paste on a surface of a polyethylene terephthalate (PET) sheet such that the coating film has a dried thickness of 10 μm, and drying the coating film at 100° C. for 1 hour. The same processing as described above is performed, except that a cured product obtained by embedding the dried coating film in a curable resin together with the PET sheet and curing the curable resin is used. In this way, a cross section that is parallel to the plane direction of the dried coating film is exposed to obtain a measurement sample (sample B). A Raman spectrum is obtained for each of the exposed cross sections of the samples A and B. A Raman spectrum of carbon particles (raw material particles) used to prepare the carbon paste is obtained by sufficiently drying the carbon particles, and then performing measurement directly on the surface of the carbon particles under the same conditions as described above, without embedding the carbon particles in a curable resin.

(2) Average Particle Size D50

As a particle size distribution measurement apparatus based on a dynamic light scattering method, for example, a light scattering spectrophotometer DLS-8000 available from Otsuka Electronics Co., Ltd. is used.

In the case of determining the average particle size D50 of a carbonaceous material taken from the carbon paste for forming the carbon layer, as a sample for determining the average particle size D50, for example, a dispersion liquid that contains a sample F obtained through the following procedure is used. A predetermined amount of the carbon paste is obtained, and dried under reduced pressure to obtain a dried product (sample C). An appropriate amount of water is added to the dried product to obtain a mixture (sample D). The mixture is subjected to centrifugation processing to separate the mixture into a solid (sample E) and a liquid (liquid I). The solid sample E is washed with water, cleaned with an organic solvent, and dried to obtain a carbonaceous material (sample F). At this time, a liquid (liquid II) obtained through washing with water and cleaning with the organic solvent is separately recovered. The sample F is dispersed in a liquid dispersion medium using a surfactant to prepare a measurement dispersion liquid.

Also, in the case of determining the average particle size D50 of a carbonaceous material taken from the carbon layer of a solid electrolytic capacitor element, as a sample for determining the average particle size D50, for example, a dispersion liquid that contains a sample K obtained through the following procedure is used. First, a sample is produced by embedding a solid electrolytic capacitor in a curable resin and curing the curable resin. The sample is subjected to grinding, milling processing, or the like to expose the carbon layer of the capacitor element. Exposed carbon particles are scraped and collected to obtain a predetermined amount of a sample (sample G). The sample G is mixed with an aqueous solution of nitric acid solution at a mass percent concentration of 1.0, and the mixture is left to stand at room temperature (20° C. or more and 35° C. or less) for 1 day. The resulting mixture (sample H) is subjected to centrifugation processing to separate the mixture into a solid (sample J) and a liquid (liquid III). The solid sample J is washed with water, cleaned with an organic solvent, and dried to obtain a carbonaceous material (sample K). At this time, a liquid (liquid IV) obtained through washing with water and cleaning with the organic solvent is separately recovered. The sample K is dispersed in a liquid dispersion medium using a surfactant to prepare a measurement dispersion liquid.

As the organic solvent used to clean the solid sample E or the sample J, for example, an organic liquid medium that can dissolve the polymer component that cannot be removed through washing with water may be selected from among the organic liquid media listed as examples of the organic liquid medium used in the carbon paste. As the dispersion medium for preparing the dispersion liquid, for example, pure water or an organic medium that is liquid at room temperature (for example, 20° C. or more and 35° C. or less) is used. Each of the type of surfactant, the concentration of surfactant, the type of dispersion medium, and the concentration of the sample F or the sample K in the dispersion liquid can be selected from a range in which it is possible to prepare a dispersion liquid suitable for average particle size D50 measurement.

(3) Ratios of First Carbonaceous Material, Acid Group-Containing Compound, Binder, and Additive In the case where the ratio of the carbon particles (first carbonaceous material) is determined based on the carbon paste, first, the mass of the sample F described above is measured, and using a known analysis method, the type of carbonaceous material is identified based on the sample F. In the case where two or more carbonaceous materials are contained, the carbonaceous materials are separated using a known separation method, and the ratio of each carbonaceous material is determined. Based on the ratios of the carbonaceous materials and the mass of the sample F, the mass of the first carbonaceous material is determined. An acid group-containing compound, a binder, an additive are separated from the liquids I and II recovered when obtaining the samples E and F described above using a known separation method, and the mass of each of the acid group-containing compound, the binder, and the additive is measured. Using a known analysis method, the type of acid group-containing compound, the type of binder, and the type of additive are identified. The ratio (mass %) of each component can be determined by dividing the mass of the component by a total mass of the acid group-containing compound, the binder, and the additive that have been separated and the carbonaceous material, and converting the quotient to percentage.

In the case where the content of the carbon particles (first carbonaceous material) is determined from the carbon layer, the content (mass %) of the first carbonaceous material can be determined in the same manner as when the content of the carbon particles is determined from the carbon paste, except that the sample K is used instead of the sample F, and the liquids II and IV are used instead of the liquids I and II. The ratios of the acid group-containing compound, the binder, and the additive can also be determined from the carbon layer in the same manner as when they are determined from the carbon paste.

In the case where the carbon layer or the carbon paste contains an acid group-containing compound, the presence of the acid group can be confirmed from the liquids I and II or the liquids III and IV using a Fourier transform infrared spectrometer (FTIR) or the like.

(Metal-Containing Layer)

As the metal-containing layer, a metal particles-containing layer, a metal foil, or the like can be used. As metal particles, silver particles, silver alloy particles, or the like can be used. The metal particles-containing layer can be formed by, for example, forming layers using a paste that contains the metal particles on a surface of the carbon layer. The paste is prepared by mixing, for example, the metal particles with a resin (also referred to as a "binder resin") and optionally a liquid medium. As the resin, a thermoplastic resin can be used, but it is preferable to use a thermosetting resin such as an imide resin or an epoxy resin.

There is no particular limitation on the type of metal that constitutes the metal foil. The metal foil is preferably made using a valve metal (aluminum, tantalum, niobium, or the like) or a valve metal-containing alloy. A surface of the metal foil may be roughened as needed. A chemically treated film may be formed on the surface of the metal foil. Alternatively, a coating film of a metal (also referred to as "dissimilar metal") that is different from the metals that constitute the metal foil, or a coating film of a non-metal may be formed on the surface of the metal foil. As the dissimilar metal, a metal such as, for example, titanium may be used. As the non-metal, carbon (conductive carbon or the like) or the like may be used.

(Others)

The solid electrolytic capacitor may be any one of a wound solid electrolytic capacitor, a chip solid electrolytic capacitor, or a stacked solid electrolytic capacitor. It is sufficient that the solid electrolytic capacitor includes at least one capacitor element, and the solid electrolytic capacitor may include a plurality of capacitor elements. For example, the solid electrolytic capacitor may include a stacked body of two or more capacitor elements. In the case where the solid electrolytic capacitor includes a plurality of capacitor elements, the capacitor elements may be, for example, wound capacitor elements or stacked capacitor elements. The configuration of the capacitor element may be selected according to the type of solid electrolytic capacitor.

In the capacitor element, one end portion of a cathode lead is electrically connected to the cathode extraction layer. One end portion of an anode lead is electrically connected to the anode body. The other end portion of the anode lead and the other end portion of the cathode lead are drawn out from the resin outer housing or the case. The other end portion of the anode lead and the other end portion of the cathode lead exposed from the resin outer housing or the case are used to make a solder connection to a substrate on which the solid electrolytic capacitor is to be mounted. As the anode lead and the cathode lead, lead wires may be used, or lead frames may be used.

The capacitor element is sealed using a resin outer housing or a case. For example, the capacitor element and a material resin (for example, an uncured thermosetting resin and a filler) for forming the outer housing may be placed in a mold, and the capacitor element may be sealed within the resin outer housing using a transfer molding method, a compression molding method, or the like. At this time, a portion of the other end portion of the anode lead and a portion of the other end portion of the cathode lead drawn out from the capacitor element are exposed from the mold. Alternatively, a solid electrolytic capacitor may be formed by housing the capacitor element in a bottomed case such that a portion of the other end portion of the anode lead and a portion of the other end portion of the cathode lead are located on the opening side of the bottomed case, and sealing the opening of the bottomed case with a sealant.

FIG. 1 is a cross-sectional view schematically showing a structure of a solid electrolytic capacitor according to an embodiment of the present disclosure. As shown in FIG. 1, a solid electrolytic capacitor 1 includes a capacitor element 2, a resin outer housing 3 that seals the capacitor element 2, and an anode terminal 4 and a cathode terminal 5 at least portions of which are exposed to the outside of the resin outer housing 3. The anode terminal 4 and the cathode terminal 5 can be made using, for example, a metal such as copper or a copper alloy. The resin outer housing 3 has a substantially rectangular parallelepiped outer shape, and the solid electrolytic capacitor 1 also has a substantially rectangular parallelepiped outer shape.

The capacitor element 2 includes an anode body 6, a dielectric layer 7 that covers the anode body 6, and a cathode portion 8 that covers the dielectric layer 7. The cathode portion 8 includes a solid electrolyte layer 9 that covers the dielectric layer 7 and a cathode extraction layer 10 that covers the solid electrolyte layer 9. The cathode extraction layer 10 includes a carbon layer 11 that covers the solid electrolyte layer 9, and a metal-containing layer 12 that covers the carbon layer 11.

The anode body 6 includes a region that opposes the cathode portion 8 and a region that does not oppose the cathode portion 8. In the region of the anode body 6 that does not oppose the cathode portion 8, in a portion that is adjacent to the cathode portion 8, an insulating separation portion 13 is formed to cover each surface of the anode body 6 in the shape of a strip, and thereby restricting the cathode portion 8 and the anode body 6 coming into contact with each other. In the region of the anode body 6 that does not oppose the cathode portion 8, the other portion is electrically connected to the anode terminal 4 through welding. The cathode terminal 5 is electrically connected to the cathode portion 8 via an adhesive layer 14 formed using a conductive adhesive.

EXAMPLES

Hereinafter, the present invention will be described specifically based on examples and comparative examples. However, it is to be noted that the present invention is not limited to the examples given below.

<<Solid Electrolytic Capacitors E1 to E4 and C1 to C2>>

Solid electrolytic capacitors as shown in FIG. 1 were produced in the manner described below, and the characteristics of the produced solid electrolytic capacitors were evaluated.

(1) Preparation of Anode Body 6

An anode body 6 was produced by roughening two opposing surfaces of an aluminum foil (with a thickness of 100 μm) as a substrate through etching.

(2) Formation of Dielectric Layer 7

A cathode forming portion of the anode body 6 was immersed in a chemical treatment solution, and then a DC voltage of 70 V was applied thereto for 20 minutes to form an aluminum oxide-containing dielectric layer 7.

(3) Formation of Solid Electrolyte Layer 9

In the anode body 6 where the dielectric layer 7 had been formed, a separation portion 13 was formed between a region of the anode body 6 where a solid electrolyte layer was to be formed and a region of the anode body 6 where a solid electrolyte layer was not to be formed by attaching an insulating resist tape thereto.

A polymerization liquid containing pyrrole (a monomer of the conductive polymer), naphthalene sulfonic acid (a dopant), and water was prepared. A portion of the anode body 6 and a Ti electrode as a counter electrode were immersed in the polymerization liquid, and a voltage was applied to the anode body such that the potential of the anode body 6 relative to that of a silver/silver chloride reference electrode was 2.8 V, so as to perform electrolytic polymerization, and a solid electrolyte layer 9 was thereby formed on the portion of the anode body 6.

(4) Formation of Cathode Extraction Layer 10

(4-1) Formation of Carbon Layer 11

A carbon layer 11 (with a thickness of 10 μm) was formed on at least a surface of the solid electrolyte layer 9 by applying a carbon paste to a surface of the anode body 6 obtained in (3) above, and drying the carbon paste. Drying was performed at 100 to 250° C. for 5 to 30 minutes.

The carbon paste was prepared by adding flake-shaped graphite particles and optionally at least one of the acid group-containing compound and the binder shown in Table 1 to a dispersion medium, and mixing them using a bead mill. The D/G ratio and the average particle size D50 of the graphite particles used were adjusted such that the D/G ratio of the dried coating film formed using the carbon paste was the value shown in the table. As the dispersion medium, a liquid medium was selected according to the type of acid group-containing compound and the type of binder so as to dissolve these components and obtain a uniform paste. The viscosity at 25° C. of the carbon paste measured through the procedure described above was 20 mPa·s. The content of the graphite particles in the carbon paste was 10 mass % (the content of the graphite particles relative to dry solids contained in the carbon paste was 66.7 mass %). In the acid group-containing compound, each of the amount of CMC salt and the amount of phenol resin was 20 parts by mass, and the amount of a phenol sulfonic acid novolak resin was 30 parts by mass relative to 100 parts by mass of the graphite particles. In the solid electrolytic capacitor E3, as a binder, 20 parts by mass of an epoxy resin was used relative to 100 parts by mass of the graphite particles was used.

(4-2) Formation of Metal-Containing Layer 12

A silver paste containing silver particles and a binder resin (an epoxy resin) was applied to a surface of the carbon layer 11, and then heated at a temperature of 100 to 250° C. for 5 to 30 minutes to cure the binder resin, and thereby a silver paste layer was formed as a metal-containing layer 12. In this way, a cathode extraction layer 10 including the carbon layer 11 and the metal-containing layer 12 was formed.

In the manner described above, a capacitor element 2 was produced.

(5) Assembly of Solid Electrolytic Capacitor

The cathode portion 8 of the capacitor element 2 obtained in (4) above and one end portion of the cathode terminal 5 were joined using an adhesive layer 14 made of a conductive adhesive. One end portion of the anode body 6 protruding from the capacitor element 2 and one end portion of the anode terminal 4 were joined through laser welding.

Next, a resin outer housing 3 made of an insulating resin was formed around the capacitor element 2 through molding using a mold. At this time, the other end portion of the anode terminal 4 and the other end portion of the cathode terminal 5 were drawn out from the resin outer housing 3.

In this way, a solid electrolytic capacitor was accomplished. Twenty solid electrolytic capacitors in total were produced in the same manner as described above.

[Evaluation]

Each of the solid electrolytic capacitors of examples and comparative examples produced in the manner described above was subjected to the following evaluation.

(1) D/G Ratio of Dried Coating Film Formed Using Carbon Paste

Using the carbon paste used to form the carbon layer, a Raman spectrum of a dried coating film was measured, and D/G ratio was determined through the procedure described above.

(2) Average Particle Size D50 of Graphite Particles

Using the carbon paste used to form the carbon layer, the average particle size D50 of carbon particles (graphite particles) contained in the carbon paste was determined through the procedure described above. The average particle size D50 was substantially the same as the average particle size D50 of the graphite particles used.

(3) Initial ESR

For each solid electrolytic capacitor, an ESR value (mΩ) at a frequency of 100 kHz was measured as the initial ESR value $(X_0)$ (mΩ) in an environment of 20° C. using a 4-terminal measurement LCR meter. The initial ESR values of the solid electrolytic capacitors are shown in relative values, where the initial ESR value of the solid electrolytic capacitor C1 was 1.

(4) Variation in ESR after High Temperature Test

Each solid electrolytic capacitor after the initial ESR measurement was subjected to a high temperature test by placing the solid electrolytic capacitor in an environment of 125° C. for 1000 hours. Then, an ESR value $(X_1)$ (mΩ) of the solid electrolytic capacitor after the high temperature test was measured in the same manner as the initial ESR value $X_0$ was measured. Using the following equation, a variation in ESR was determined.

$$\text{Variation in } ESR = X_1/X_0$$

(5) Variation in ESR after High Temperature and Humidity Test

Each solid electrolytic capacitor after the initial ESR measurement was subjected to a high temperature and high humidity test by placing the solid electrolytic capacitor in an environment of 125° C. and 80% RH for 1000 hours. Then, an ESR value $(X_2)$ (mΩ) of the solid electrolytic capacitor after the high temperature and high humidity test was measured in the same manner as the initial ESR value $X_0$ was measured. Using the following equation, a variation in ESR was determined.

$$\text{Variation in } ESR = X_2/X_0$$

The evaluation results are shown in Table 1. The solid electrolytic capacitors E1 to E4 correspond to solid electrolytic capacitors of examples, and solid electrolytic capacitors C1 to C2 correspond to solid electrolytic capacitors of comparative examples.

TABLE 1

| | Acid group-containing compound | D/G ratio | D50 (μm) | Initial ESR | Variation in ESR after high temperature test | Variation in ESR after high temperature and high humidity test |
|---|---|---|---|---|---|---|
| E1 | CMC salt | 0.495 | 0.7 | 0.5 | 1.7 | 1.3 |
| | Phenol sulfonic acid novolak resin | | | | | |
| E2 | CMC salt | 0.714 | 0.8 | 0.7 | 4.7 | 4.6 |
| E3 | — | 1.171 | 11 | 0.8 | 15.9 | 15.1 |
| E4 | Phenol resin | 1.212 | 4 | 0.8 | 15 | 14.5 |
| C1 | CMC salt | 1.713 | 1.2 | 1 | 21.1 | 16.3 |
| | Phenol sulfonic acid novolak resin | | | | | |
| C2 | CMC salt | 1.544 | 0.1 | 1.2 | 34.3 | 19.4 |
| | Phenol sulfonic acid novolak resin | | | | | |

As shown in Table 1, in the case where the D/G ratio of the dried coating film formed using the carbon paste (or the carbon layer) was 1.5 or less, the variation in ESR after high temperature test was suppressed to a low level, and the initial ESR was also low (E1 to E4). Also, in the solid electrolytic capacitors E1 to E4, the variation in ESR after high temperature and high humidity test was also lower than those of the comparative examples. When the D/G ratio was 1.5 or less, a tendency was observed that the variation in ESR after high temperature test or high temperature and high humidity test was smaller as the average particle size D50 of the carbon particles contained in the carbon layer was smaller. When the D/G ratio was 1 or less (preferably 0.8 or less), the variation in ESR after high temperature test or high temperature and high humidity test was remarkably small.

The present invention has been described in terms of the presently preferred embodiments, but the disclosure should not be interpreted as limiting. Various alterations and modifications will no doubt become apparent to those skilled in the art to which the invention pertains, after having read the disclosure. Accordingly, it is to be understood that the appended claims be interpreted as covering all alterations and modifications which fall within the true spirit and scope of the present invention.

INDUSTRIAL APPLICABILITY

With a solid electrolytic capacitor according to the present disclosure, ESR can be suppressed to a low level even when the solid electrolytic capacitor is exposed to a high temperature environment or a high temperature and humidity environment. Accordingly, the solid electrolytic capacitor can be used in various applications where high reliability is required.

REFERENCE SIGNS LIST 1 solid electrolytic capacitor
2 capacitor element
3 resin outer housing
4 anode terminal
5 cathode terminal
6 anode body
7 dielectric layer
8 cathode portion
9 solid electrolyte layer
10 cathode extraction layer
11 carbon layer
12 metal-containing layer
13 separation portion
14 adhesive layer

The invention claimed is:

1. A solid electrolytic capacitor element comprising:
an anode body;
a dielectric layer formed on a surface of the anode body;
a solid electrolyte layer that covers at least a portion of the dielectric layer; and
a carbon layer that covers at least a portion of the solid electrolyte layer and contains carbon particles,
wherein the carbon layer shows a D/G ratio of 1.5 or less, the D/G ratio being a ratio of an intensity of a D band relative to an intensity of a G band in a Raman spectrum of the carbon layer;
the carbon particles have an average particle size D50 of 0.1 μm or more and 10 μm or less; and
the carbon layer contains a cellulose resin having a carboxy group or a salt thereof.

2. The solid electrolytic capacitor element in accordance with claim 1,
wherein the D/G ratio is 1 or less.

3. The solid electrolytic capacitor element in accordance with claim 1,
wherein the carbon particles include flake-shaped particles.

4. A solid electrolytic capacitor comprising at least one of the solid electrolytic capacitor elements in accordance with claim 1, and a resin outer housing made of an insulating resin around the at least one of the solid electrolytic capacitor elements.

5. The solid electrolytic capacitor element in accordance with claim 1,
wherein the cellulose resin includes carboxymethyl cellulose (CMC).

6. A carbon paste for a solid electrolytic capacitor element that is used to form a carbon layer included in the solid electrolytic capacitor element, the carbon paste comprising:
carbon particles; and a dispersion medium,
wherein a dried coating film formed using the carbon paste shows a D/G ratio of 1.5 or less, the D/G ratio being a ratio of an intensity of a D band relative to an intensity of a G band in a Raman spectrum of the dried coating film;
the carbon particles have an average particle size D50 of 0.1 μm or more and 10 μm or less; and
the carbon layer contains a cellulose resin having a carboxy group or a salt thereof.

* * * * *